(12) United States Patent  
Karpel et al.

(10) Patent No.: US 6,922,787 B2
(45) Date of Patent: Jul. 26, 2005

(54) METHOD AND SYSTEM FOR PROVIDING A FLEXIBLE TEMPERATURE DESIGN FOR A COMPUTER SYSTEM

(75) Inventors: Isaac Karpel, Cary, NC (US); William Fred Keown, Raleigh, NC (US); Randall Scott Springfield, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 610 days.

(21) Appl. No.: 09/929,807

(22) Filed: Aug. 14, 2001

(65) Prior Publication Data
US 2003/0037266 A1 Feb. 20, 2003

(51) Int. Cl.$^7$ ................................................ G06F 1/26
(52) U.S. Cl. ........................ 713/320; 713/300; 700/31; 340/584; 455/127.1
(58) Field of Search ................................ 713/300, 320; 369/53.12; 340/584; 219/667; 455/127.1; 700/31

(56) References Cited

U.S. PATENT DOCUMENTS

| | | | |
|---|---|---|---|
| 4,690,569 A | * | 9/1987 | Veitch ......................... 374/11 |
| 5,249,741 A | | 10/1993 | Bistline et al. |
| 5,488,331 A | * | 1/1996 | Keane et al. .............. 330/296 |
| 5,550,750 A | * | 8/1996 | Wolff .......................... 716/10 |
| 5,560,023 A | | 9/1996 | Crump et al. |
| 5,566,340 A | | 10/1996 | Stewart et al. |
| 5,694,607 A | | 12/1997 | Dunstan et al. |
| 5,721,837 A | | 2/1998 | Kikinis et al. |
| 5,926,386 A | | 7/1999 | Ott et al. |
| 6,073,206 A | | 6/2000 | Piwonka et al. |
| 6,336,080 B1 | * | 1/2002 | Atkinson .................... 702/132 |
| 6,349,269 B1 | * | 2/2002 | Wallace, Jr. ................ 702/132 |
| 6,574,740 B1 | * | 6/2003 | Odaohhara et al. ......... 713/323 |
| 6,769,059 B1 | * | 7/2004 | Qureshi et al. ................ 713/2 |

* cited by examiner

*Primary Examiner*—Rehana Perveen
(74) *Attorney, Agent, or Firm*—George E. Grosser; Dillon & Yudell LLP

(57) ABSTRACT

A method and system for providing correct operational parameters for up-level design components utilized within a computer system after a low level basic input/output system (BIOS) code has been qualified. A patch file is created or obtained for a component that is added to a computer system after a BIOS code has been qualified for the computer system. The patch file includes the operating parameters (or profiles) of the component. The flash module is designed with a memory block reserved for holding data from the patch file, which can be updated independently of the rest of the flash module. The Advance Configuration Program Interface (ACPI) or advanced power management (APM) code of the computer system is modified to dynamically read the parameters from this memory block and update their respective functions accordingly. During set up of the computer system, the patch file is flashed into the reserved block of the flash module. The data is merged by the FLASH utility into the existing BIOS so that the computer system has the correct parameters for the particular component.

15 Claims, 3 Drawing Sheets

METHOD AND SYSTEM FOR PROVIDING A FLEXIBLE TEMPERATURE DESIGN FOR A COMPUTER SYSTEM

BACKGROUND OF THE INVENTION

1. Field of the Invention

The present invention relates in general to data processing systems and, in particular, to temperature controls of a data processing system. Still more particularly, the present invention relates to a method and system for providing flexible temperature control for a data processing system.

2. Description of the Related Art

Integrated circuits (ICs) and other electrical devices generally have rated operating temperature ranges. Within these operating ranges, the devices behave according to specified requirements. Outside of the rated operating range, the response characteristics of the circuits and devices can vary from the specified requirements. At elevated temperatures, for example, integrated circuits and other electrical devices may fail or burn out or otherwise become defective.

Processor chips of computer systems are well known examples of integrated circuits. In addition to the processor or central processing unit (CPU), a computer system also comprises associated volatile and non-volatile memory, including random access memory (RAM) and basic input/output system read only memory (BIOS/ROM). These components are primarily ICs, which require particular ranges of temperature for correct operating temperature ranges.

In a computer system, continued operation of an electronic component leads to the generation of heat. In some instances, albeit rare, ambient air is sufficient to provide cooling to maintain the IC within the desired operating temperature range. However, some ICs generate enough heat to require affirmative cooling from a cooling fan. Typically, computers have included one or more cooling fans or heat sinks, etc., inside the computer housing to prevent overheating caused by the normal operation of the computer. The operation of the cooling fan is controlled by the computer system's BIOS, which receives parameter inputs from a flash memory associated with the processor to manage the temperature acoustics within the computer system (e.g., read temperature profiles, determine fan speeds, turn fan on and off, etc.). Power-on self test (POST) and BIOS are both typically stored as a single flash image in a storage device such as a flash memory. This image is commonly called the "boot code". BIOS includes base modules which are the minimum required in order to properly boot a computer system. The temperature parameters are often provided by the manufacturer of the individual component and included within the temperature control mechanisms (i.e., BIOS, flash memory, fans, etc.) of the computer system. The temperature control circuitry monitors the cooling fans to verify that the fans are powered on and rotating at a predetermined speed to maintain a desired thermal condition that precludes accelerated failures of the electronic components utilized in the computer systems.

During design of large scale computer systems for commercial clients, the system developer/designer (or vendor) typically provides the customer with a qualifying process during which the operating system, overall hardware, and BIOS are "tested" and finalized for the computer system. This testing/qualifying stage typically occurs many months prior to delivery of the actual computer system to the customer. However, the customer is provided with the necessary BIOS and OS so that the customer may begin preparation for immediate installation of the computer system upon delivery. Following a satisfactory testing process, the customer prepares for delivery of the system and enters into a purchasing phase during which the system is acquired over a period of time (e.g., 12–18 months).

Typically, during the purchasing phase, the developer makes upgrades or improvements to the system's hardware. These upgrades often involve utilization of more advanced processors, which become available to the developer after the qualifying process. Thus, for example, the designer may utilize faster processors, which dissipate heat at a higher/faster level than the previous processors utilized during the qualifying process. Also, the processor may be replaced with a higher revision level of the processor, which may exhibit different operating characteristics.

When the customer receives the finished computer system, the customer usually back-flashes the BIOS to the older level (from the qualifying period). Thus the memory module (e.g., EEPROM) is erased and the old BIOS code is "flashed" into the module, including the provided temperature parameters for the down-level processor. However, these temperature parameters are not able to provide the correct operating environment for the processor provided with the system. This creates a problem whenever the processor vendor creates a new processor, which has a different thermal characteristic than past processors. When the customer back-flashes, the computer system will have down-level thermal controls, which could cause problems with system integrity. If the developer is able to predict the temperature profile required for the newer processor during the qualifying process, the developer may create the BIOS with the correct temperature parameters; however, the developer is usually unable to predict far enough into the future to determine what the industry may do in terms of development of better and faster processors with different temperature profiles.

Thus, the extended development process, from qualifying of the computer system to actual delivery, creates a problem with computer systems that are designed for commercial customers particularly when the customer back-flashes a qualified BIOS code from several months before to support a computer system that has gone through upgrades in its processor. With the coming of the Intel P4 and rate of development of higher speed processors, more complex thermal solutions are required for commercial computer systems.

Various methods have been provided to handle temperature control in a computer system. For example, U.S. Pat. No. 5,249,741 provides a method of cooling a computer with a plurality of components that obtains the cooling requirement for the components and varies the rate of one or more of the cooling units based on the cooling requirement. U.S. Pat. No. 5,926,386 provides a configuration-based cooling fan speed controller comprising generally of an EEPROM. The controller may be set in auto mode by which the component configuration detected and the cooling fan speeds retrieved from a fan speed table stored in the EEPROM. However, none of the available methods provides a solution to the problem of updating temperature response for new processors when the new processor is placed in an already qualified system.

The present invention thus recognizes that it would be desirable to provide a method and system for providing flexible temperature parameter adjustments from added components to a computer system. A method and system by which a BIOS within a flash module is updated without requiring erasure and reinstallation of the entire BIOS would be a welcomed improvement. These and other benefits are provided by the invention described herein.

SUMMARY OF THE INVENTION

A method and system are disclosed for providing correct operational parameters for up-level design components utilized within a computer system after a low level basic input/output system (BIOS) code has been qualified. A patch file is created or obtained for a component that is added to a computer system after a BIOS code has been qualified for the computer system. The patch file includes the operating parameters (or profiles) of the component. The flash module is designed with a memory block reserved for holding data from the patch file, which can be updated independently of the rest of the flash module. The Advance Configuration Program Interface (ACPI) or advanced power management (APM) code of the computer system is modified to dynamically read the parameters from this memory block and update their respective functions accordingly. During set up of the computer system, the patch file is flashed into the reserved block of the flash module. The data is merged by the FLASH utility into the existing BIOS so that the computer system has the correct parameters for the particular component.

In the preferred embodiment, the component is a processor and the parameter of interest is the thermal profile or operating temperature. The thermal profile comprises parameters indicating at what temperatures the system's fans are to be engaged, at which temperatures thermal throttling is to be utilized, and at what temperatures the processor will be shut down. The processor operates with different temperature control parameters than that provided within the qualified BIOS. In one embodiment, if the correct thermal solution is not available, the power-on self test (POST) code prompts the user to pick up the latest patch code, and the latest thermal solution can then be stored into the reserved memory block.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

Figure 2:
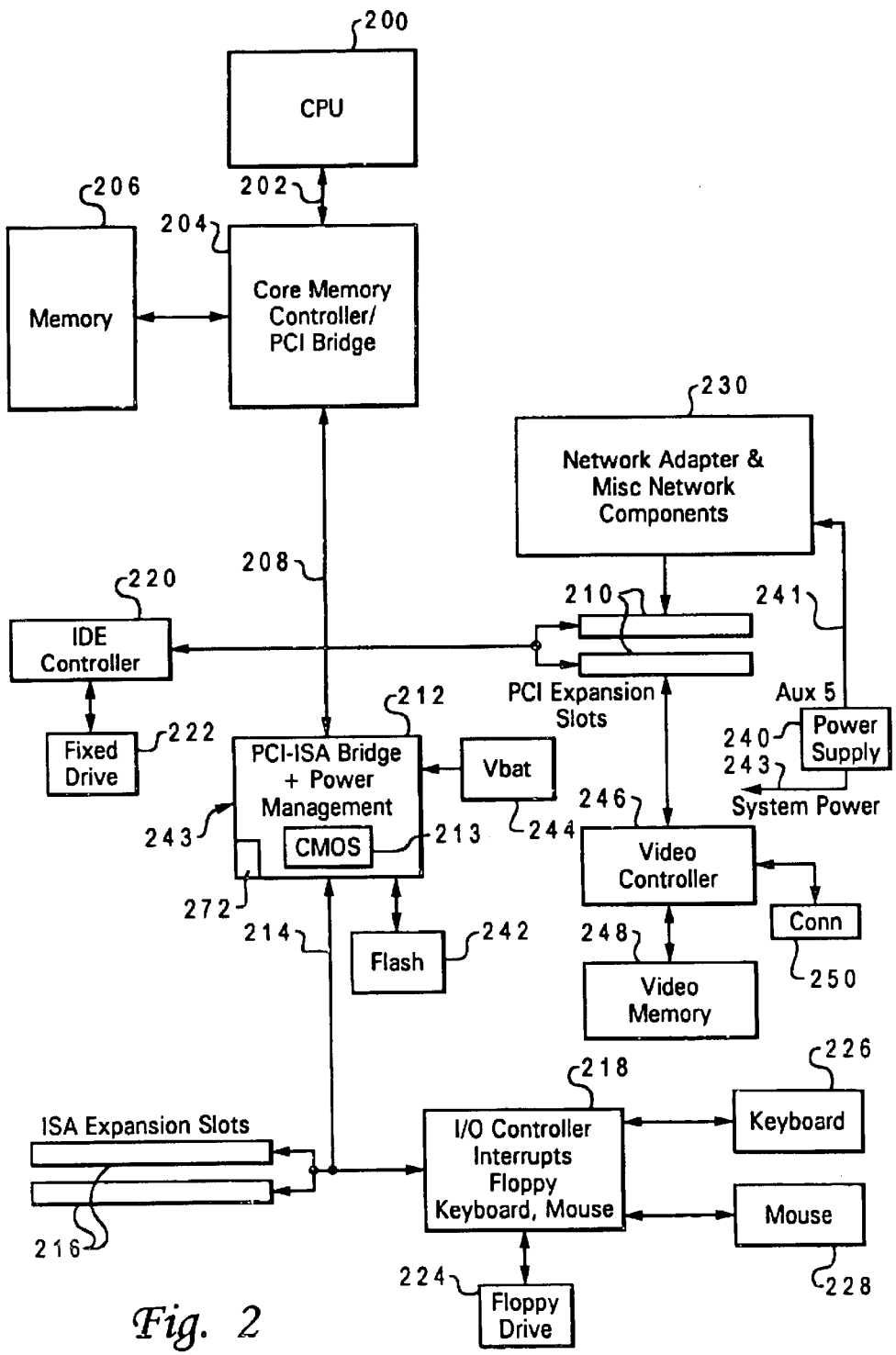
FIG. 2 illustrates a block diagram representation of a data processing system in which the elements of the present invention may preferably be implemented.

With reference now to the figures and in particular with reference to FIG. 2, there is illustrated a detailed pictorial representation of a computer system within which the features of the present invention may be implemented. The Computer system includes a planar (also commonly called a motherboard or system board) which provides a means for mounting and electrically interconnecting various components, including a central processing unit (CPU) 200, system memory 206, and accessory cards or boards as is well known in the art.

CPU 200 is connected by address, control, and data busses 202 to a memory controller and peripheral component interconnect (PCI) bus bridge 204 which is coupled to system memory 206. Computer system includes an integrated drive electronics (IDE) device controller 220 and a PCI bus to Industry Standard Architecture (ISA) bus bridge 212 that is connected to PCI bus bridge 204 utilizing PCI bus 208. IDE controller 220 provides for the attachment of IDE compatible storage devices, such as a hard disk (or fixed) drive 222. PCI/ISA bridge 212 provides an interface between PCI bus 208 and an optional feature or expansion bus such as the ISA bus 214. PCI/ISA bridge 212 includes power management logic. PCI/ISA bridge 212 is supplied power from battery 244 to prevent loss of configuration data stored in CMOS 213.

A PCI standard expansion bus with connector slots 210 is coupled to PCI bridge 204. PCI connector slots 210 may receive PCI bus compatible peripheral cards. An ISA standard expansion bus with connector slots 216 is connected to PCI/ISA bridge 212. ISA connector slots 216 may receive ISA compatible adapter cards (not shown). It will be appreciated that other expansion bus types may be used to permit expansion of the system with added devices. It should also be appreciated that two expansion busses are not required to implement the present invention.

An I/O controller 218 is coupled to PCI-ISA bridge controller 212. I/O controller 218 controls communication between PCI-ISA bridge controller 212 and devices and peripherals such as floppy drive 224, keyboard 226, and mouse 228 so that these devices may communicate with CPU 200.

PCI-ISA bridge controller 212 includes an interface for a flash memory 242 which includes an interface for address, data, flash chip select, and read/write. Flash memory 242 is an electrically erasable programmable read only memory (EEPROM) module and includes BIOS that is used to interface between the I/O devices and operating system. Base BIOS modules are stored in flash 242. In addition, BIOS settings used to configure the client during the boot are stored in flash 242. The present invention provides a flash module with reserved memory block, which is described in detail below in reference to FIG. 3.

When a computer is reset or initially powered-on, a boot process is initiated. The boot process includes a Power On Self Test (POST) and hardware initialization via a basic input/output system (BIOS). POST is an initialization code which configures the system utilizing initialization settings stored in storage, such as CMOS storage. Once POST has configured the system, BIOS then controls the basic operation of the hardware utilizing the hardware as it was configured by POST. The BIOS is code that controls basic hardware operations, such as interactions with disk drives, hard drives, and the keyboard. The boot process is complete once an operating system has been handed control of the system. In order for the boot process to be complete, POST must complete its execution.

The illustrated computer system includes a video controller 246 which may, for example, be plugged into one of PCI expansion slots 210. Video controller 246 is connected to video memory 248. The image in video memory 248 is read by controller 246 and displayed on a monitor (not shown) which is connected to the computer system through connector 250.

Computer system also includes a power supply 240 which supplies full normal system power 243, and has an auxiliary power main AUX 5 241 which supplies full time power to the power management logic 212 and to network adapter 230.

Figure 3:
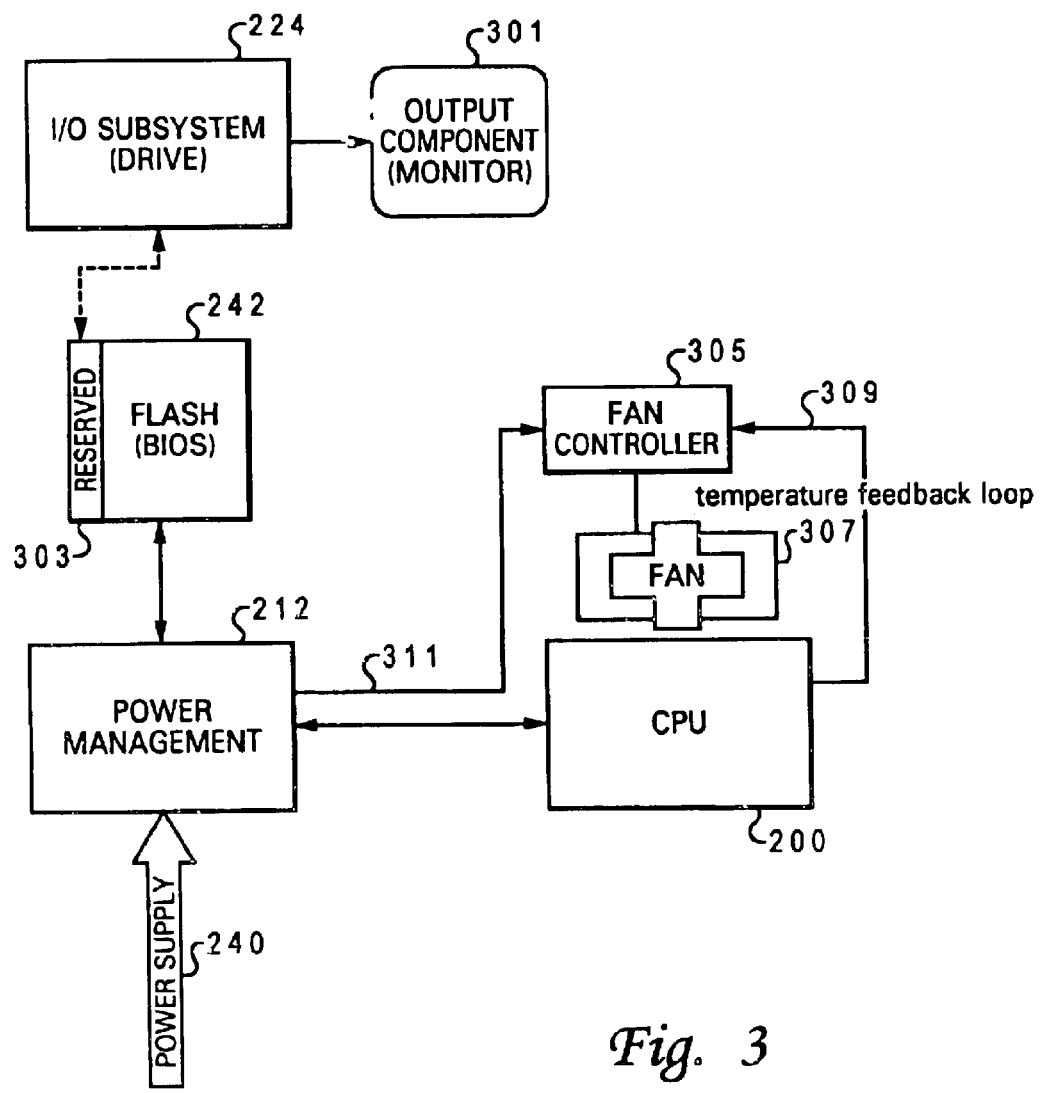
FIG. 3 depicts a block diagram representation of an exemplary configuration of the temperature control components of the data processing system of FIG. 1 in accordance with the present invention.

FIG. 3 illustrates temperature control and monitoring components utilized to provide the temperature control features of the computer system in accordance with the method and system of the present invention. Specifically, FIG. 3 provides an expanded view of the major components required for temperature control and parameter setup within the computer system of FIG. 2.

The present invention is a method and system for providing correct operational parameters for design components provided within a computer system after a basic input/output system (BIOS) code has been qualified. According to the preferred embodiment, and as illustrated herein, the flash module 242 is designed with a memory block 303 that is reserved for holding specific types of data associated with the BIOS and which may be independently provided via a patch file. The reserved memory block 303 may therefore be updated independently of the rest of the flash module 242. The Advance Configuration Program Interface (ACPI) or advanced power management (APM) code of the computer system is modified to dynamically read the parameters from this reserved memory block 303 and update their respective functions accordingly. During set up of the computer system, a patch file is flashed into the reserved memory block 303 of the flash module 242. The data stored in the reserved memory block 303 after a BIOS has been flashed to the flash module 242 is linked (or merged) by the flash utility into the existing BIOS so that the computer system is provided the correct operating parameters for the particular component.

The preferred embodiment of the invention will be described with specific reference to processors and provides correct thermal profiles for the processor 200 of the computer system. Specifically, the thermal profile provided within the invention comprises parameters indicating at what temperatures the computer system's fans are to be engaged, at which temperatures thermal throttling is to be utilized, and at what temperatures the processor 200 will be shut down. In the illustrative embodiment, the processor operates with different temperature control parameters than that provided within the qualified BIOS.

Returning now to FIG. 3, the electronic components of the computer system associated with the invention generally include a power supply 240 for providing power to the computer system, a non-volatile memory device, i.e., flash memory 242, I/O subsystem 224 for permitting later installation of a patch file, output component 301 for alerting a user when a patch file is required, as described further below, and a fan assembly, including a fan controller 305 and a variable speed, integrated fan 307. Also illustrated are temperature feedback loop 309 and power line to fan controller 311. Processor 200 generates heat when in operation. To dissipate the generated heat and prevent component failure due to elevated temperatures, the integrated fan assembly is utilized in the illustrated embodiment to provide a means of removing the generated heat from the enclosure (not shown) that houses the processor. The operation of integrated fan assembly is monitored and controlled by processor 200, which provides a feedback 309 to fan controller 305 to increase or reduce current flow from power management unit 212 to speed up or slow down the fan 307.

The fan's speed is varied based upon the management of the power provided to the fan by the fan controller 305. That is, the speed of fan 1 is controlled by the management of the voltage on power line 311. For example, a voltage of 16 volts D.C. will run a fan at full speed whereas a voltage of 8 volts D.C. will run the same fan at half speed. In the preferred embodiment, the operation parameters of the processor 200 stored within the reserved memory block is utilized to determine when the fan controller 305 sends power to the fans (i.e., turns the fans on) and how much power to send (i.e., what fan speed), etc. The fan controller 305 then provides the designated amount of voltage to the fan thereby controlling the amount of cooling performed by that fan. The construction and operation of integrated fan assembly is not provided in further detail as that is not the focus of the invention. Also, different methods of operation are possible within the general scope of the invention.

Figure 1:
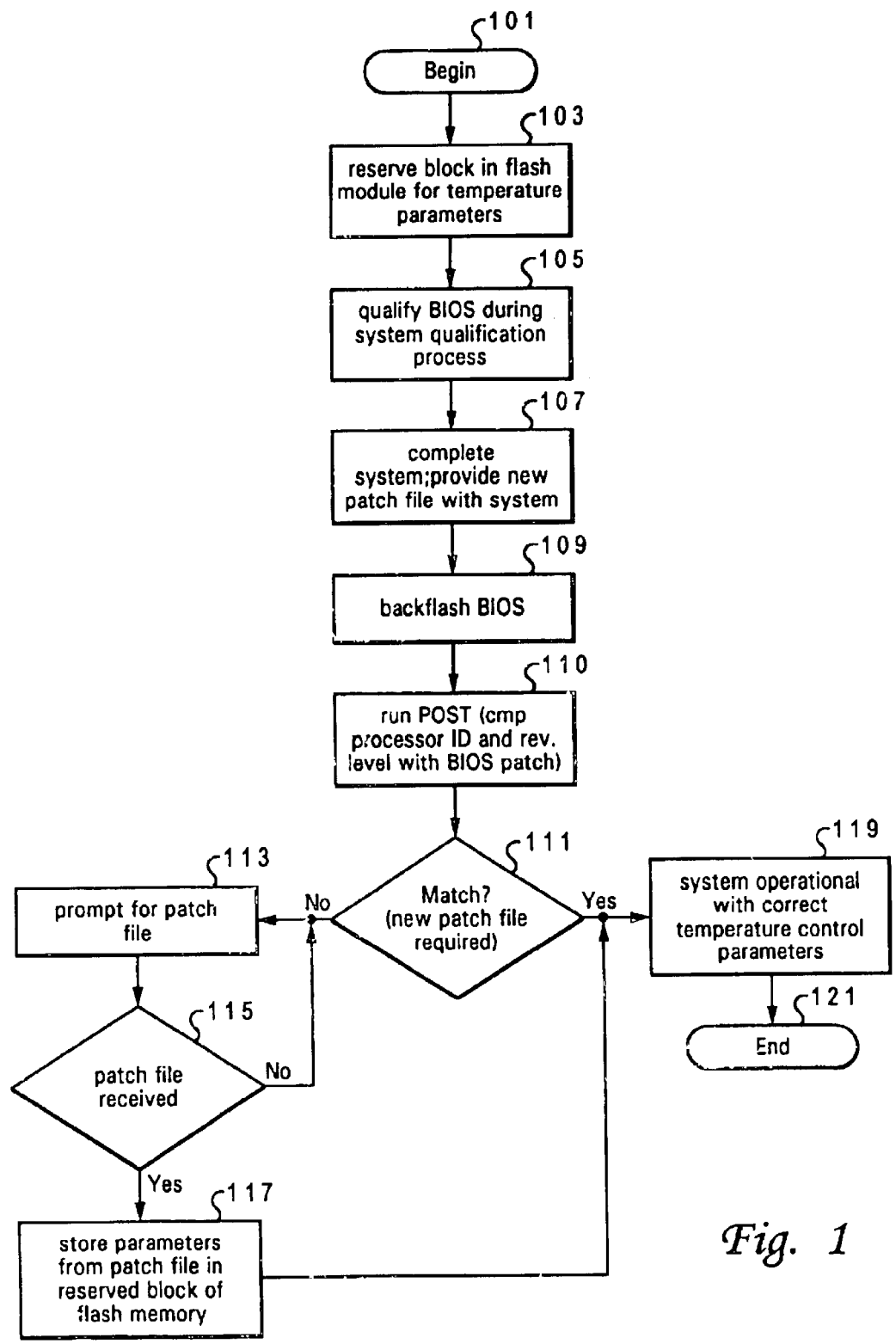
FIG. 1 illustrates a high level flow chart depicting the general process by which a computer system is provided with a down-level BIOS and correct temperature control parameters according to the preferred embodiment of the present invention.

Referring now to FIG. 1, there is illustrated a process flow by which the various features of the invention are implemented. The process begins as depicted by block 101 and thereafter passes to block 103, which illustrates a computer system's flash module being configured with a reserved memory block for storing temperature parameters utilized by the BIOS. Following, the BIOS for the computer system is qualified during system qualification process as shown at block 105.

The BIOS is designed to recognize the reserved memory block 303 as the area in which the temperature parameters are held within the flash module 242. The system is then completed and patch files provided for the new processors utilized during actual development of the computer system as illustrated at block 107. The BIOS is then back-flashed into the computer systems flash module as depicted at block 109. During initial backflash of the BIOS, the original temperature parameters are stored in the reserved memory block 303.

According to the preferred embodiment, the processor's ID and revision level is tagged to the corresponding patch code. When the computer system is powered-on, the POST recognizes that the temperature parameters are for the original processor (i.e., not the current processor) and prompts the user to obtain and install the patch file for the current processor. A compare is completed during POST (or boot up) of the processor's ID and revision level and the ID and revision level of the patch file as shown at block 110. A determination is made at block 111 whether there is a match between the processor's ID and revision level and that of the patch file. When the patch file ID and/or revision level does not match that of the processor, the user is prompted via the computer monitor (or other I/O component) that the correct patch file is required as illustrated at block 113. In one embodiment, the specific ID of the patch file required may also be provided to the user to aid the user in locating the patch file. Accordingly, the POST utility dynamically checks for correct configuration and alerts the user when a potential problem is found. If the boot comparison indicates a match between the processor's ID and the ID of the patch file, then the qualified patch file is loaded in the memory module and the boot completes as normal. The system begins operation with the correct temperature control parameters as shown at block 119 and the process ends as indicated at block 121.

According to the preferred embodiment, a flash diskette is provided with temperature profiles for the current processor and is utilized to complete the process of updating the flash module. A determination whether a provided patch file is the correct patch file is made at block 115. When the correct patch file is provided, the code on the diskette directs the processor to automatically write the data to the memory block 303 of the flash module 242 as shown at block 117. The patch file is written over the data in the memory block 303 (i.e., previous data from the qualified BIOS is deleted and replaced with the data of the patch file). Thus, when the flash of the patch file is completed, the computer system operates with the qualified BIOS but provides correct temperature controls for the current processor.

To facilitate completion of the update to the memory block, each processor that is released has an associated patch file which fixes problems with the processor. The developer or vendor provides the customer with a copy of the patch file. In the preferred embodiment, the patch file includes a thermal profile, and other data may be included in the patch file as well. The patch file may be provided on a computer readable medium such as a computer disk or CD ROM. Additionally, the patch file may be available from the manufactures web site and downloaded directly to the computer system from the web site.

The APCI/APM code is modified to dynamically read this thermal profile and update their functions accordingly. This data is merged by the BIOS utility so that a customer always has the correct thermal solution for a particular processor. In the preferred embodiment, if the correct thermal solution is not available, the POST code will automatically prompt the user for the latest patch code.

In one embodiment, threshold values are defined within the BIOS when the correct patch file is not provided for the processor (as determined during POST). The threshold values are stored within the memory block of the flash module. The threshold values represent conservative values that are selected so as to protect the processors from overheating in the event that the processor is in fact generating greater heat dissipation or requires more cooling than the qualified level stored in the memory module. Although these reserve values may cause the computer system fans to turn on at a faster time or operate at greater speeds than required, the net results protect the user's processors from overheating. In this embodiment, the processor is alerted that the correct temperature parameters were not provided and the user is prompted on a regular basis for updates to the patch file.

By implementing the above thermal solution when new processors are released having new thermal characteristics, the computer manufacturer is able to foresee and prepare for changes within the thermal envelope of the processors without requiring a re-qualifying of the computer system's components when the computer system is shipped to the customer.

Although the invention has been described with reference to specific embodiments, this description should not be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method comprising:

allocating a memory location within a flash module of a data processing system to storing a patch file with thermal profile data for a processor of the data processing system;

providing thermal profile data within said patch file about an installed processor of said data processing system;

modifying an advance configuration program interface/advanced power management (ACPI/APM) code of said data processing system to dynamically read said thermal profile from the patch file and update an associated temperature control function;

associating said thermal profile data within a BIOS of said data processing system via a FLASH utility, wherein said BIOS operates with the thermal profile data taken from said patch file; and enabling dynamic updates of the thermal profile data and the BIOS via a new patch file stored within the memory location.

2. The method of claim 1, wherein said thermal profile data includes at least one of a first temperature at which fans of said system will engage, a second temperature at which temperatures thermal throttling will be utilized, and a third temperature at which said processor shuts down, said method further comprising dynamically controlling temperature control utility of said data processing system to respond according to said data.

3. The method of claim 2, further comprising:

executing a power-on self test (POST) operation for said data processing system;

comparing processor ID with an ID associated with said patch file; and when said processor ID matches said ID of said patch file, also comparing a revision level of said processor with a revision level provided within said patch file.

4. The method of claim 3, wherein:

responsive to said revision level of said processor matching said revision level provided within said patch file, completing said POST and operating said data processing system with thermal profiles of said patch file; and when said revision level of said processor does not match said revision level provided within said patch file, prompting a user of said data processing system for a correct patch file for said processor.

5. The method of claim 4, wherein:

said prompting step includes providing within the prompt a description of a correct processor ID and revision level of the requited patch file to said user.

6. The method of claim 5, wherein, when a patch file having a correct thermal solution is not provided for said processor, said method comprises initiating operations of said data processing system utilizing a pre-established threshold level for operation of said temperature controls, wherein said threshold level corresponds to a minimum level above which adequate cooling is applied to any processor by said BIOS, irrespective of said processor's actual recommended cooling requirements.

7. A data processing system comprising:

a processor;

a flash module having a memory location that is independently updateable via a patch file and is reserved for storing operating parameters for components within the data processing system;

a modified advance configuration program interface/advanced power management (ACPI/APM) code that dynamically reads said operating parameters from the patch file and updates an associated function of the corresponding components;

a basic input/output system (BIOS);

means for associating said operating parameters with a BIOS of said data processing system via a FLASH utility;

wherein said operating parameters includes a thermal profile of the processor and said date processing system further comprise means for providing thermal data within said patch file about said processor, wherein said data include a first temperature at which fans of said system will engage, a second temperature at which temperatures thermal throttling will be utilized, and a third temperature at which said processor shuts down;

a temperature control utility; and means for enabling the temperature control utility to respond according to said thermal data.

8. The data processing system of claim 7, further comprising:

means for executing a power-on self test (POST) operation for said data processing system; and means for comparing a processor ID with an ID associated with said patch file.

9. The data processing system of claim 8, further comprising means, when said processor ID matches said ID of said patch file, for comparing a revision level of said processor with a revision level provided within said patch file.

10. The data processing system of claim 9, further comprising:

means, responsive to said revision level of said processor matching said revision level provided within said patch file, for completing said POST and operating said data processing system with thermal profiles of said patch file; and means, when said revision level of said processor does not match said revision level provided within said patch file, for prompting a user of said data processing system for a correct patch file for said processor.

11. The data processing system of claim 9, further comprising means for prompting a user of said data processing system for a correct patch file for said processor when said processor ID does not match said ID of said patch file.

12. The data processing system of claim 11, wherein said means for prompting includes providing at least a description of a correct processor ID and revision level to said user with a prompt.

13. The data processing system of claim 12, wherein, when a correct thermal solution is not provided for said processor, said data processing system comprises means for operating said data processing system utilizing a predetermined threshold level for operation of said temperature controls, wherein said threshold level corresponds to a minimum level above which adequate cooling is applied to any processor by said BIOS irrespective of said processor's recommended cooling requirements.

14. A data processing system, comprising:

a flash module having a memory block reserved for storing temperature control parameters of selected components of the data processing system, said memory block being independently updateable via a patch file;

means for receiving and inputting said data of said patch file from a user provided medium into the memory block of said flash module;

means for flashing a BIOS into said flash module; and means for subsequently flashing temperature control parameters from a patch file into said section of said flash module without deleting said BIOS, wherein said BIOS is associated with said parameters to provide efficient operation of the selected components of said data processing system;

wherein said parameters includes temperature related parameters, said data processing system further comprising means for controlling a temperature of a processor of said data processing system utilizing said BIOS and said associated parameters within said memory block of said flash module, wherein said temperature related parameters includes one or more of a first temperature at which fans of said system will engage, a second temperature at which temperature thermal throttling will be utilized, and a third temperature at which said processor shuts down.

15. A computer program product comprising:

a computer readable medium; and program code on said computer readable medium for:

dynamically updating a temperature profile of a processor within a flash module of a data processor system; and triggering an alert to a POST operation when a correct temperature profile file is provided;

wherein further said program code comprises a file ID corresponding to a processor ID and a revision level indicator, wherein further said program code automatically installs data corresponding to said temperature profile into a flash module of said data processing system when said file ID matches a processor ID of a processor being utilized within said data processing system and said revision level matches a revision level of said processor.

* * * * *